United States Patent
Paolozzi et al.

(10) Patent No.: US 10,014,643 B2
(45) Date of Patent: Jul. 3, 2018

(54) BUS BAR INCLUDING A WIRING CONNECTOR ASSEMBLY

(71) Applicants: Alexander Paolozzi, Toronto (CA); Ryan Coelho, Toronto (CA)

(72) Inventors: Alexander Paolozzi, Toronto (CA); Ryan Coelho, Toronto (CA)

( * ) Notice: Subject to any disclaimer, the term of this patent is extended or adjusted under 35 U.S.C. 154(b) by 0 days.

(21) Appl. No.: 15/281,302

(22) Filed: Sep. 30, 2016

(65) Prior Publication Data

US 2017/0040788 A1    Feb. 9, 2017

Related U.S. Application Data

(63) Continuation-in-part of application No. 15/257,219, filed on Sep. 6, 2016.

(60) Provisional application No. 62/261,846, filed on Dec. 1, 2015.

(51) Int. Cl.
| | |
|---|---|
| *H01R 4/28* | (2006.01) |
| *H01R 43/26* | (2006.01) |
| *H01R 4/48* | (2006.01) |
| *H01R 11/09* | (2006.01) |
| *H02G 3/16* | (2006.01) |
| *H01R 101/00* | (2006.01) |

(52) U.S. Cl.
CPC ........... *H01R 43/26* (2013.01); *H01R 4/4827* (2013.01); *H01R 11/09* (2013.01); *H02G 3/16* (2013.01); *H01R 2101/00* (2013.01)

(58) Field of Classification Search
CPC ....... H01R 43/26; H01R 4/4827; H01R 11/09
USPC ........................................................ 439/725
See application file for complete search history.

(56) References Cited

U.S. PATENT DOCUMENTS

| | | | |
|---|---|---|---|
| 6,280,233 B1* | 8/2001 | Beege | H01R 4/4827 439/441 |
| 6,341,989 B1 | 1/2002 | Jaag | |
| 6,551,119 B1* | 4/2003 | Sakamoto | H01R 13/514 439/287 |
| 6,875,062 B2 | 4/2005 | Bouley et al. | |
| 7,101,231 B2 | 9/2006 | Prokup et al. | |
| 7,896,685 B2 | 3/2011 | Eppe et al. | |
| 7,993,156 B2 | 8/2011 | Holste | |
| 9,466,911 B1 | 10/2016 | Wu | |
| 9,525,216 B2 | 12/2016 | Wu et al. | |
| 9,614,306 B2 | 4/2017 | Hewer et al. | |
| 9,680,237 B2 | 6/2017 | Aporius et al. | |
| 2008/0158788 A1 | 7/2008 | Darr et al. | |

(Continued)

*Primary Examiner* — Abdullah Riyami
*Assistant Examiner* — Nader Alhawamdeh
(74) *Attorney, Agent, or Firm* — Sand & Sebolt

(57) ABSTRACT

An electrical distribution box including a bus bar with a quick connect assembly for engaging or disengaging wiring. The bus bar housing defines an interior chamber and includes a wall defining a plurality of holes and release ports therein A space bar within the chamber includes a plurality of spaced-apart fixed contacts and spring contacts. Each spring contact includes an arm that moves towards or away from the fixed contact and is partially aligned with one hole and one release port in the housing. The spring contact moves from an at rest position by inserting a wire through one of the holes. The spring contact locks the wire between itself and the fixed contact. The wire is release by inserting a tool through the release port and applying a linear force to the spring contact, thereby rotating the spring contact away from the fixed contact and releasing the wire.

23 Claims, 13 Drawing Sheets

(56) References Cited

U.S. PATENT DOCUMENTS

| | | |
|---|---|---|
| 2011/0039455 A1 | 2/2011 | Hayashi |
| 2011/0207361 A1* | 8/2011 | Heckert ............... H01R 4/4836 |
| | | 439/350 |
| 2011/0223795 A1 | 9/2011 | Schafmeister |
| 2013/0052884 A1 | 2/2013 | Hanses |
| 2016/0056548 A1 | 2/2016 | Wendt |
| 2016/0190713 A1 | 6/2016 | Wu et al. |
| 2016/0218450 A1 | 7/2016 | Wendt et al. |
| 2016/0352026 A1* | 12/2016 | Fischer .................... H01H 5/00 |
| 2017/0040716 A1 | 2/2017 | Paolozzi et al. |

\* cited by examiner

BUS BAR INCLUDING A WIRING CONNECTOR ASSEMBLY

CROSS-REFERENCE TO RELATED APPLICATIONS

This application is a Continuation-in-Part of U.S. patent application Ser. No. 15/257,219, filed Sep. 6, 2016, which claims the benefit of US Provisional Patent Application No. 62/261,846 filed Dec. 1, 2015, the entire disclosures of which are incorporated herein by reference in their entirety.

BACKGROUND OF THE INVENTION

Technical Field

This invention relates generally to electrical devices. More particularly, the invention is directed to electrical distribution boxes and to the components used therein. Specifically, the invention is a bus bar for use in an electrical distribution box that includes a connector assembly which allows wires to be quickly and easily engaged with the neutral bus bar without the use of screws and that permits insertion of a tool through a release port in a front face of the neutral bus bar for quick and easy disengagement of a previously secured wire.

Background Information

Electrical distribution boxes are components that form part of an electrical supply system for a building. The electrical distribution box divides an incoming power supply into subsidiary circuits. Each subsidiary circuit includes a circuit breaker or fuse that is located in the electrical distribution box. Hot and neutral wires from an external meter may connect to a main breaker on the electrical distribution box. A plurality of circuit breakers is typically arranged in two parallel columns within the electrical distribution box. Wires (i.e., electrical conductors) must be secured to the circuit breakers, to a neutral bus and/or to a ground bus. Making electrical connections between the wiring and the proper terminals and buses inside of the electrical distribution box can be a time consuming an labor intensive process.

Many types of electrical devices require an electrical connection to electrical wiring that carries 110V, 22V and even up to 600V of AC. Electrical devices such as wall outlets, light switches, circuit breakers neutral bus bars and ground buses may be provided with screw terminals to allow for attachment of wires thereto. Screw terminals require that a screw be partially loosened, an end of a length of wire is stripped of insulation, the stripped length of wire is wrapped around the shaft of the screw, and then the screw is tightened to lock the wire and screw together. In other devices the screw terminals may be replaced with a quick connect system. In these instances, an end of a stripped piece of wire is inserted through an aperture in a spring-loaded connector. The connectors typically have a spring-steel contact that is in close contact with an opposed fixed metal contact. The stripped end of the wire is inserted into the aperture that is defined between the two contacts. When inserted, the wire slightly bends the spring metal contact and the wire is thus captured between the contacts. Since both contacts are electrically conductive, the insertion of the wire closes the circuit and thereby allows current to flow through the circuit. In these types of connectors, the spring metal contact may be bent and shaped so that the angle of the spring contact relative to the fixed contact is less than 90 degrees so that the inserted wire is able to push the spring contact back to allow space for the wire. Any force that attempts to withdraw the wire will cause the spring contact to tighten its grip on the wire and thus resist accidental removal of the wire. Typically, once the wire is inserted, the wire cannot be removed and must be cut if the switch or outlet is to be removed. Since it is essentially impossible to remove the wire once inserted in these connectors, it becomes necessary to cut the wire and throw away the entire switch, outlet, circuit breaker or bus. While this is acceptable for a relatively inexpensive wall outlet, the cost for discarding a number of circuit breakers (at a cost of about $40-$50 per unit) or bus bars quickly adds up if an electrical distribution box is to be rewired.

SUMMARY

There is therefore a need in the art for a electrical devices, such as neutral bus bars or ground bus bars that may be quickly and easily connected to and disconnected from an electrical distribution box without requiring cutting of the electrical wires engaged with the bus bar and then discarding the bus. The neutral bus bar disclosed herein solves some of the issues of the prior art and allows for quicker and easier connection and disconnection of the bus.

An electrical distribution box including a bus bar with a quick connect assembly for engaging or disengaging wiring and a method of using the same is disclosed herein. The bus bar housing defines an interior chamber and includes a wall defining a plurality of holes and release ports therein A space bar within the chamber includes a plurality of spaced-apart fixed contacts and spring contacts. Each spring contact includes an arm that moves towards or away from the fixed contact and is partially aligned with one hole and one release port in the housing. The spring contact moves from an at rest position by inserting a wire through one of the holes. The spring contact locks the wire between itself and the fixed contact. The wire is release by inserting a tool through the release port and applying a linear force to the spring contact, thereby rotating the spring contact away from the fixed contact and releasing the wire.

In one aspect, the invention may provide a bus bar for an electrical distribution box comprising a housing having a wall that bounds and defines an interior chamber; said wall further defining a hole and a release port therein, where the hole and release port are in communication with the chamber; an electrically conductive fixed contact located within the chamber; an electrically conductive spring contact located within the chamber; said spring contact having an arm that is selectively movable toward or away from the fixed contact; wherein the spring contact is partially aligned with the hole and is partially aligned with the release port; and wherein the spring contact is movable from a first position to a second position upon application of a force through the hole; and is moveable from the second position to a third position upon application for a force through the release port.

In another aspect, the invention may provide a method using a neutral bus bar of an electrical distribution box, said method comprising providing a neutral bus bar having a housing, a fixed contact and a spring contact located within a chamber defined by the housing; inserting a stripped end of the wire into a hole defined in the housing; deflecting the spring contact with the end of the wire; and capturing the end of the wire between the spring contact and the fixed contact.

The method may further include the step of deflecting the spring contact includes applying a first linear force to the spring contact with the end of the wire. The method may further comprise inserting a tool through a release port defined in a wall of the housing; engaging the spring contact with the tool; applying a force to the spring contact using the tool; moving a portion of the spring contact through application of the linear force; opening a gap between the spring contact and the fixed contact; and withdrawing the end of the wire out of the hole in the housing.

The step of applying a force to the spring contact using the tool comprises applying a linear force to the spring contact and the step of moving the portion of the spring contact further comprises rotating the portion of the spring contact in response to the applying of the linear force.

In another aspect, the invention may provide an electrical distribution box comprising a box housing defining an interior compartment; at least one bus bar, wherein each of the at least one bus bar comprises a bus bar housing having a wall that bounds and defines an interior chamber; said wall further defining a hole and a release port therein, where the hole and release port are in communication with the chamber; an electrically conductive fixed contact located within the chamber; an electrically conductive spring contact located within the chamber; said spring contact having an arm that is selectively movable toward or away from the fixed contact; wherein the spring contact is partially aligned with the hole and is partially aligned with the release port; and wherein the spring contact is movable from a first position to a second position upon application of a force through the hole; and is moveable from the second position to a third position upon application for a force through the release port.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
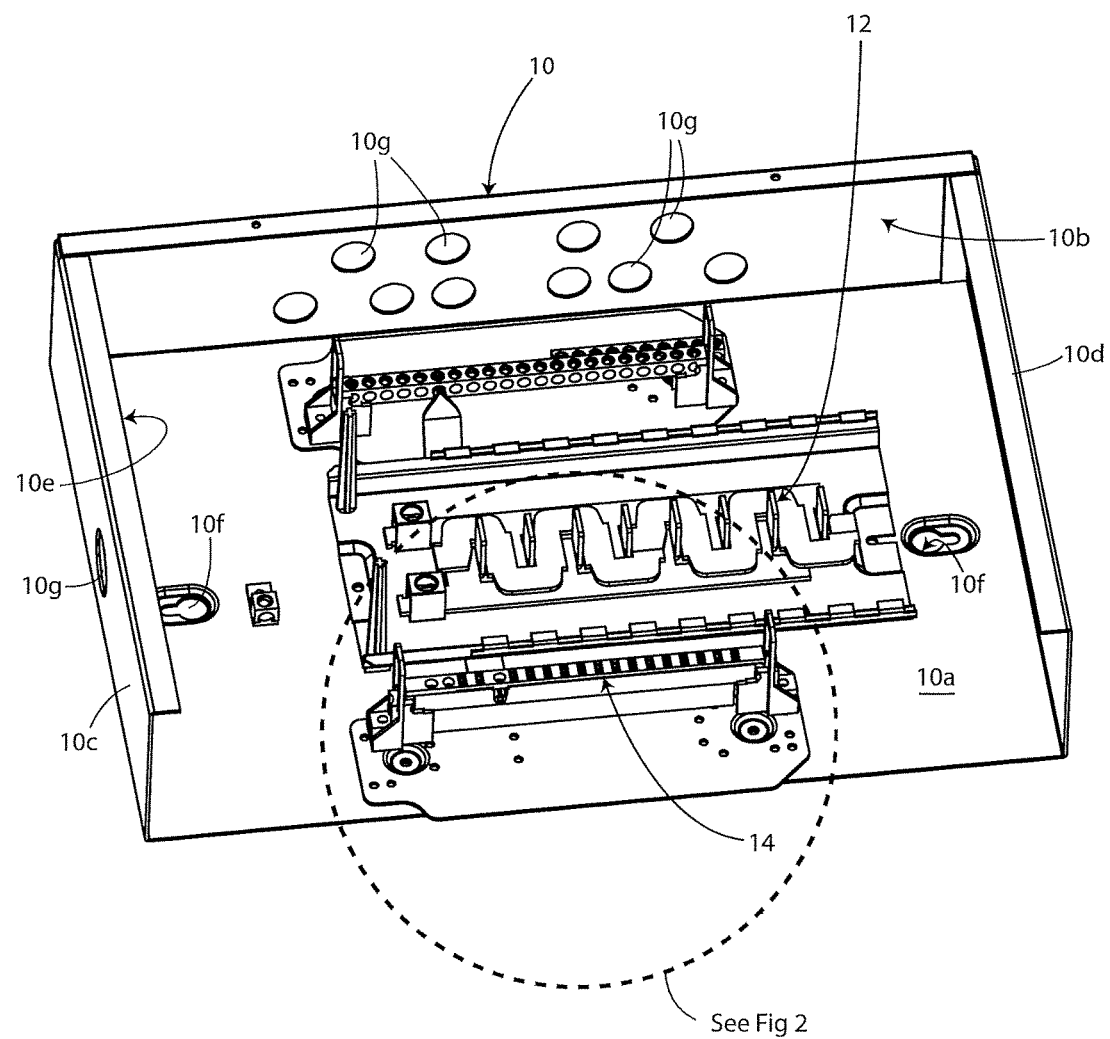
FIG. 1 is a perspective view of an electrical distribution box with a front cover removed and showing a neutral bus bar in accordance with an aspect of the present invention.
Figure 2:
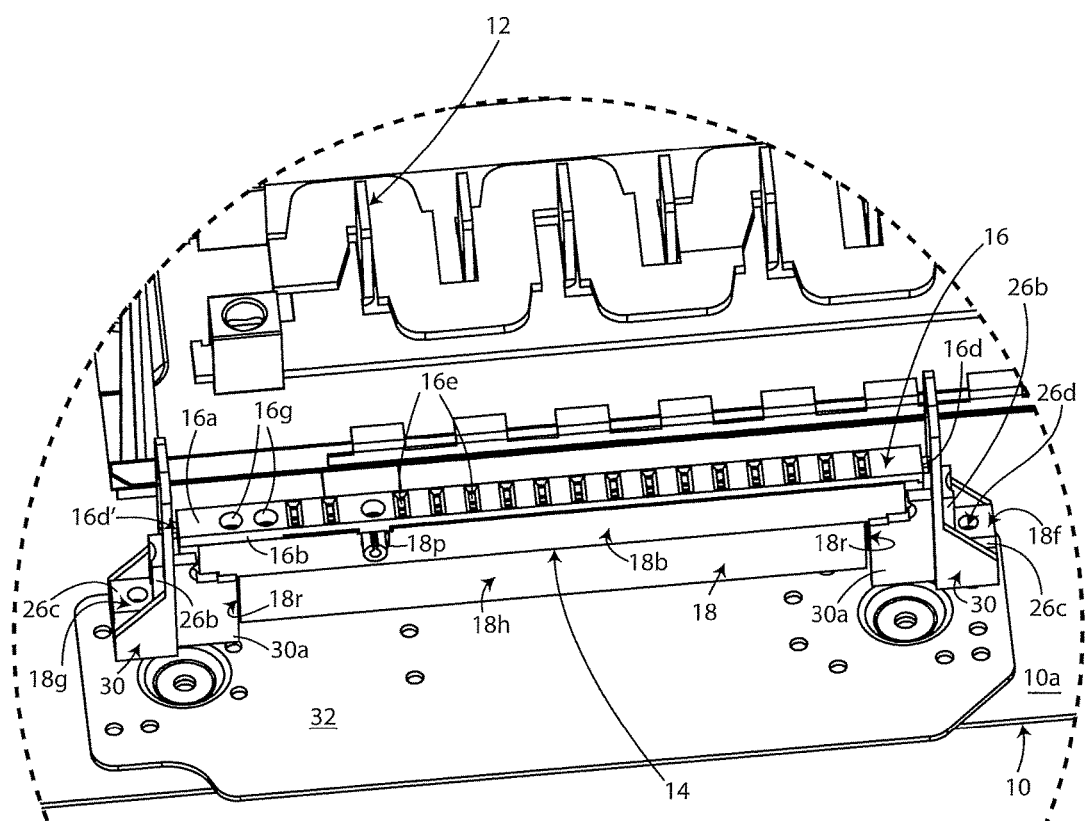
FIG. 2 is an enlargement of the highlighted region of FIG. 1.
Figure 3:
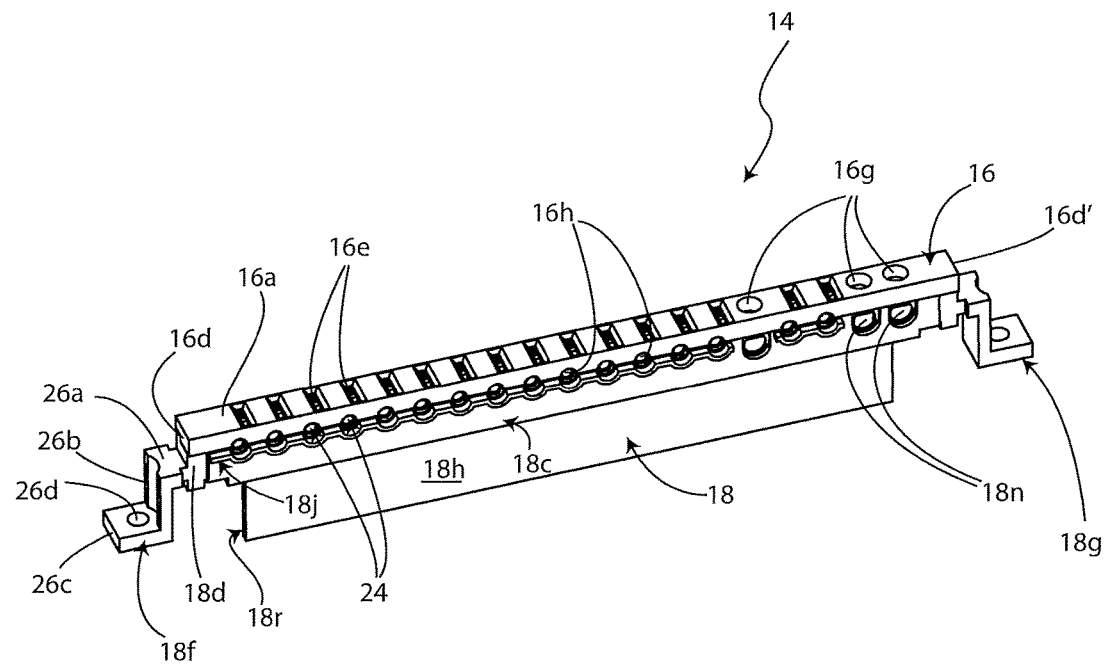
FIG. 3 is a perspective view of the neutral bus bar shown on its own.
Figure 4:
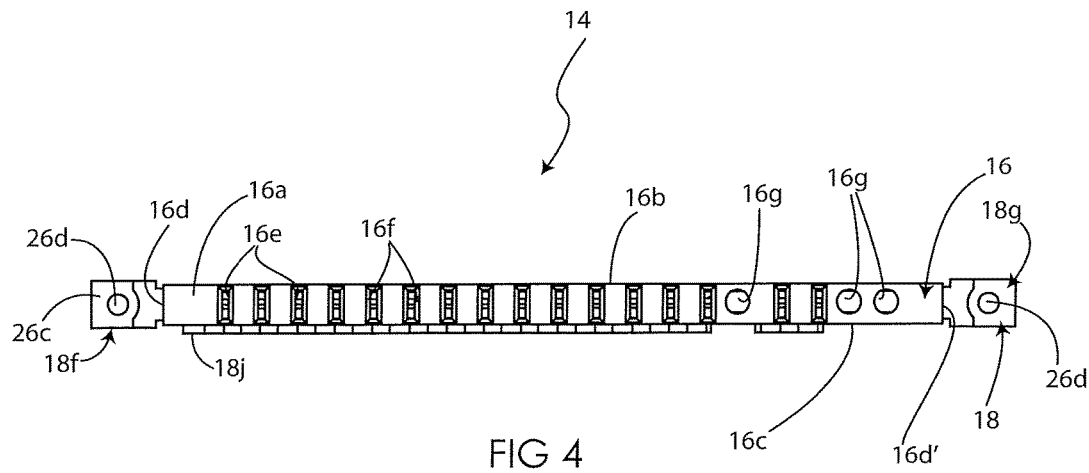
FIG. 4 is a top view of the neutral bus bar.

FIGS. 1 and 2 show an electrical distribution box 10 with a breaker bar 12 and a neutral bus bar 14 in accordance with an aspect of the present invention. It will be understood that only certain components that may be provided within box 10 are illustrated in this figure for context. It should also be understood that while the description that follows relates to a neutral bus bar 14, the principles incorporated in bar 14 may be utilized in other components such as in a ground bus.

Box 10 may comprise a housing fabricated from metal and including a rear wall 10a, first and second side walls 10b (only one of which is shown in FIG. 1), a top wall 10c and a bottom wall 10d. A cover (not shown) will typically be engaged with side wall 10b, top wall 10c or bottom wall 10d. The cover is selectively between an open position and a closed position. When the cover is moved to a closed position it blocks off access to an interior cavity 10e of the housing. Rear wall 10a may be mountable to a vertical support surface, such as a wall of a building, in any suitable way. For example, one or more fasteners may be inserted through holes 10f in rear wall 10a of housing 10 and into the support surface. A plurality of apertures 10g may be defined in any of the walls 10b-10d. Electrical cables that supply power from a remote meter to electrical distribution box 10 may enter cavity 10e through a selected one or more of apertures 10g and be connected to various components within box 10 by electrical conductors or wires. For example, the cables may be connected by suitable wiring to a main breaker, to a plurality of circuit breakers, to neutral bus bar 14 or ground bus bars etc.

FIGS. 3-7 show neutral bus bar 14 in accordance with an aspect of the present invention in greater detail. Bus bar 14 includes a top housing 16, a bottom housing 18 and a spring bar 20. Spring bar 20, in association with cooperative components on housing 16, 18 comprises a quick connect assembly for connecting electrical wiring to bus bar 14.

Top housing 16 and bottom housing 18 may be fabricated from a electrically non-conductive material such as plastic. As a result, bus bar 14 may be touched by a user without running the risk of being shocked. Spring bar 20, on the other hand, may be fabricated from an electrically conductive material such as brass or plated steel. Spring bar 20 is received within a cavity defined by top housing 16 and bottom housing 18 and therefore will not accidentally be touched by a user.

Top housing 16 may be an elongate member that may be substantially rectangular in shape when viewed from the top. Top housing 16 may include a top wall 16a, a first side wall 16b, a second side wall 16c, a first end wall 16d, and a second end wall 16d'. Top wall 16a defines a plurality of release ports 16e therein that are spaced at regular intervals from each other. A beveled edge 16f bounds an entrance to each release port 16e. The bevel angles downwardly toward release port 16e. The beveled edge 16f is provided to direct a disengagement tool (as will be describe later herein) into release port 16e. As illustrated, each release port 16e is generally rectangular in shape and the beveled edge 16f is also rectangular when viewed from above. This can be seen more clearly in FIG. 11. It will be understood, however, that any desired shape release port may be provided on top housing 16 (or on lower housing 18; and on any accessible wall of top housing 16 or bottom housing 18.) When top housing 16 is engaged with bottom housing 18, the top and bottom housings 16, 18 bound and define an interior chamber 22. Each release port 16e is in communication with chamber 22.

Top wall 16a of top housing 16 also defines a plurality of holes 16g therein. As illustrated, top wall 16a defines three holes 16g therein that are in communication with chamber 22. A first hole 16g may be separated by a space from a second hole 16g and a third hole 16g. The second hole 16g and third hold 16g may be spaced from each other but be adjacent each other. First hole 16g may be separated from the adjacent second and third holes 16g by a section of top wall 16a that may define one or more release ports 16e therein. It will be understood that fewer or more holes 16g may be defined in top housing 16 and the location and placement of the holes 16g may be other than what is illustrated in the attached figures.

Second side wall 16c may define a plurality of semicircular recesses 16h on a lower edge thereof. Each recess 16h originates in a bottom surface 16j (FIG. 7) of top housing 16 and extends for a distance upwardly towards top wall 16a. Recesses 16h may be spaced at regular intervals from each other along second side wall 16c. Regions of second side wall 16c, such as the regions that are laterally aligned with holes 16g in top wall 16a, may be free of any recesses 16h.

Figure 7:
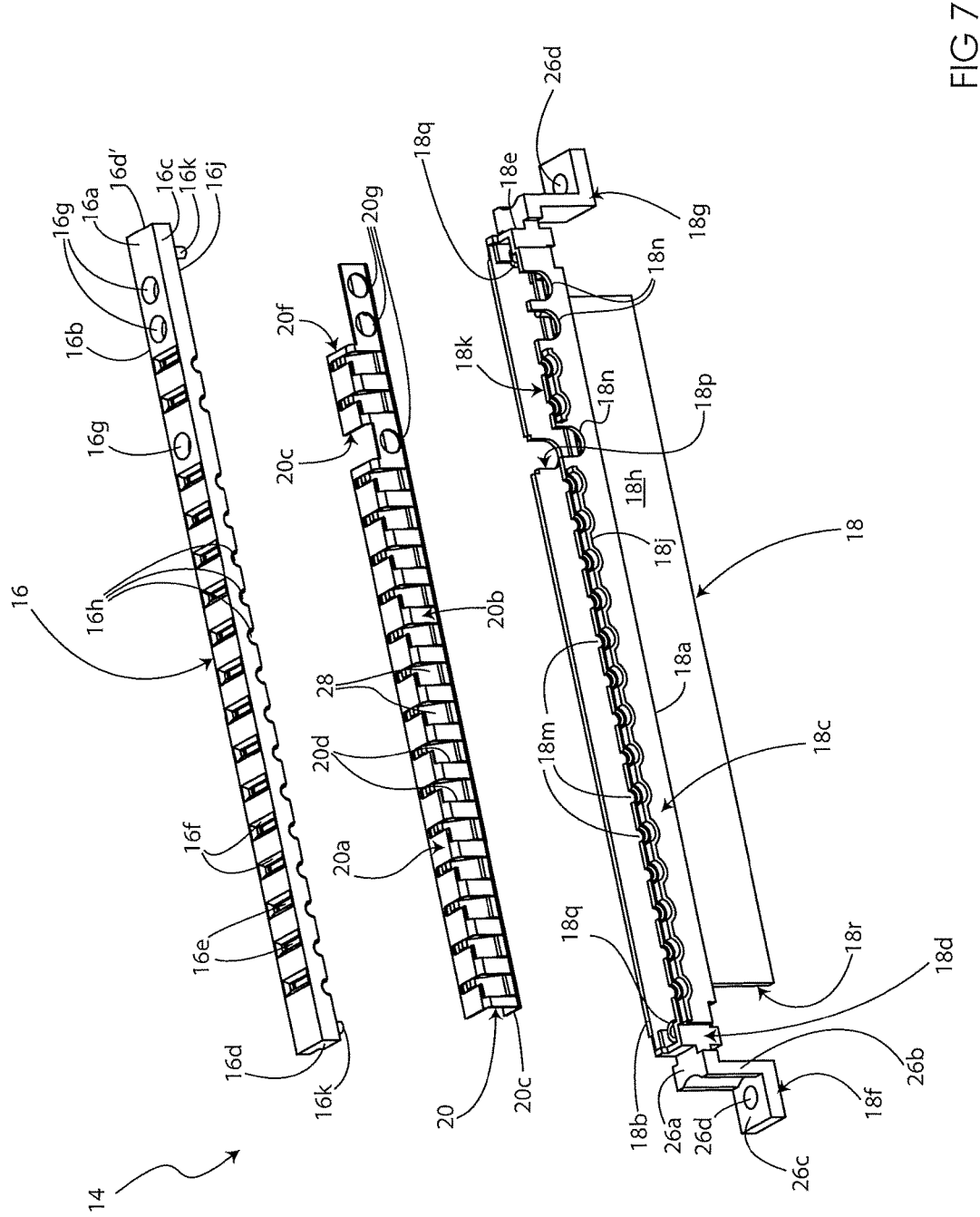
FIG. 7 is an exploded view of the neutral bus bar.
Figure 8:
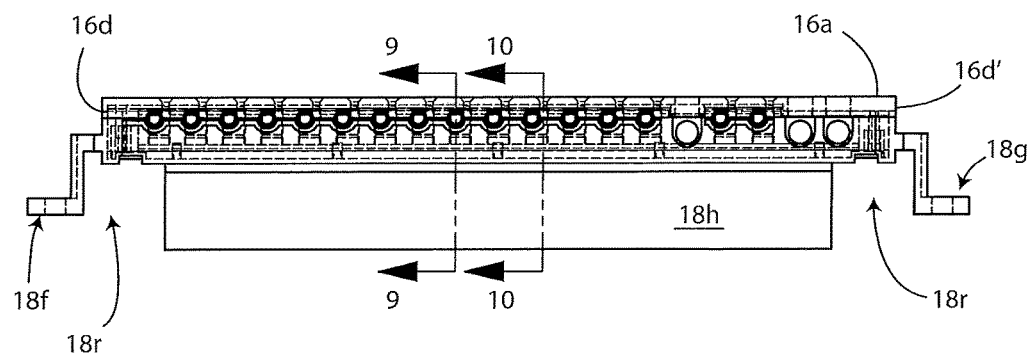
FIG. 8 is a cross-sectional side view of the neutral bus bar.

FIG. 7 also shows that one or more pegs 16k extend downwardly from bottom surface 16j of top housing 16. Pegs 16k are provided to engage top housing 16 with bottom housing 18, as will be later described herein.

Bottom housing 18 includes a bottom wall 18a, a first side wall 18b, a second side wall 18c, a first end 18d, a second end 18e, a first connector 18f, a second connector 18g and a flange 18h. Flange 18 may be positioned along a longitudinal centerline of bottom housing 18 and extend outwardly from an exterior of bottom wall 18a, being oriented generally at right angles to bottom wall 18a. Flange 18 terminates at a lower edge 18h' located a distance vertically remote from bottom wall 18a.

A lip 18j extends laterally outwardly from a region of second side wall 18c. Lip 18j may run from proximate first end 18d to proximate second end 18e of bottom housing 18. Bottom wall 18a, first and second side walls 18b, 18c and first and second ends 18d, 18e, bound and define an interior compartment 18k that forms part of the chamber 22 of neutral bus bar 14 when top housing 16 and bottom housing 18 are engaged with each other.

Second side wall 18c may define a plurality of semicircular recesses 18m on an upper edge thereof. Each recess 18m originates in a top surface of bottom housing 18 and extends for a distance downwardly towards bottom wall 18a thereof. Recesses 18m may additionally be defined in lip 18j. The recesses 18m defined in lip 18j provide an additional surface for supporting a portion of a wire thereon as will be later described herein. Recesses 18m may be spaced at regular intervals from each other along second side wall 18c and lip 18j. Various sections of bottom housing 18 may be free of recesses 18m. For instance, the section of bottom housing 18 that is laterally aligned with first hole 16g and second and third holes 16g, may be free of recesses 18m.

Each recess 18m is positioned to align with one of the recesses 16h on top housing 18. When top housing 16 and bottom housing 18 are selectively engaged together, recesses 16h and 18m together form holes 24 (FIGS. 3 and 5) that are in communication with chamber 22. It will be understood that other differently shaped recesses 16h, 18m may be provided on top housing 16 and bottom housing 18 and the resulting hole 24 may thereby be other than what is illustrated in the attached figures; i.e., other than circular in shape.

Second side wall 18c may also define a plurality of U-shaped recesses 18n (FIG. 7) that may originate in an upper edge of bottom housing 18 and extend for a distance downwardly towards bottom wall 18a. FIG. 7 shows that three U-shaped recesses 18n may be defined on bottom housing 18. A first one of the recesses 18n may be positioned to laterally align with one of the holes 16g in top housing 16; and the second and third recesses 18n may each be laterally aligned, respectively, with one of the second and third holes 16g in top housing 16. This can be seen in FIG. 3. The first recess 18n is spaced a distance away from the second and third recesses 18n. The second and third recesses 18n are spaced-apart but located adjacent each other. A fourth recess 18p may be defined in first side wall 18b. Fourth recess 18p may be laterally aligned with the first recess 18n in second side wall 18c as can be seen from FIG. 7. It will further be understood that fewer or more recesses 18n, 18p than what is illustrated in the attached figures, may be provided on bottom housing 18.

Bottom housing 18 may also define two detents 18q (FIG. 7) that extend upwardly from an interior surface of bottom wall 18a. Each detent 18q is located adjacent an interior surface of one of first end 18d and second end 18e. Detents 18q are positioned to align with pegs 16k that extend downwardly from top housing 16. Each detent 18q defines a bore (unnumbered) that is complementary to one of the pegs 16k. Pegs 16k are received in the bores of detents 18q when top housing 16 is engaged with bottom housing 18. It will be understood that the number of detents 18q provided on bottom housing 18 is complementary to the number of pegs 16k provided on top housing 18. It will further be understood that fewer or more pegs 16k and detents 18q than what is shown in the attached figures may be provided on bus bar 14. Additionally, the positions of the pegs 16k and detents 18q may be different than what is illustrated in the attached figures.

Figure 5:
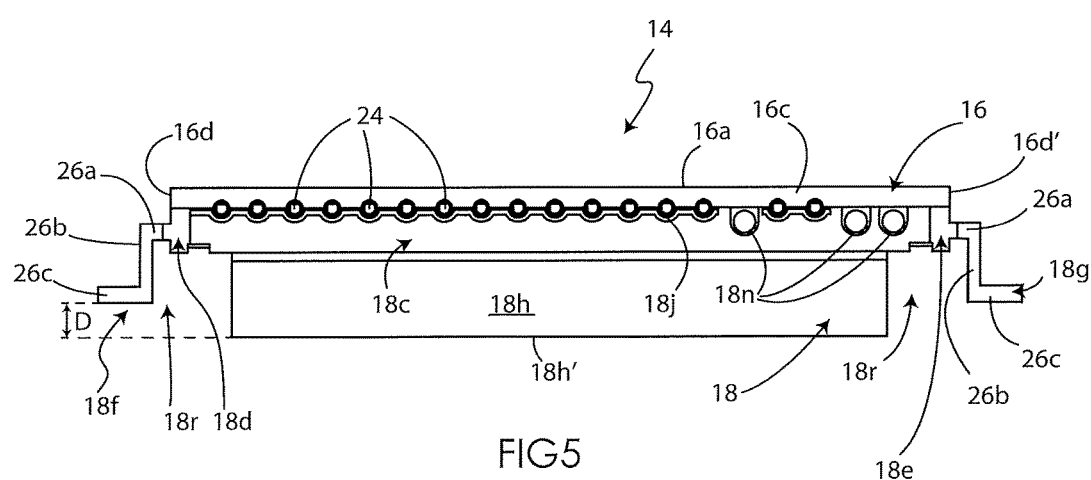
FIG. 5 is a side view thereof.
Figure 6:
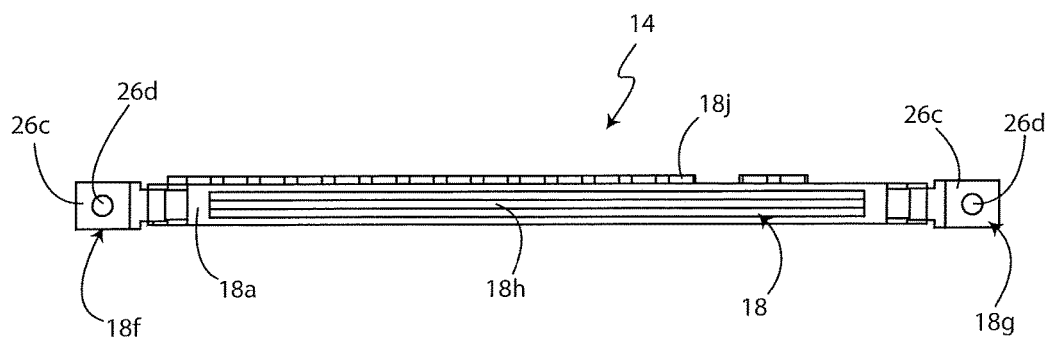
FIG. 6 is a bottom view thereof.

Connectors 18f, 18g may extend outwardly from first end 18d and second end 18e of bottom housing 18, respectively. Connectors 18f, 18g may be of any suitable configuration for securing bus bar 14 to electrical distribution box 10 and the configuration of connectors 18f, 18g shown herein are by way of example. Connector 18f, 18g may be substantially identical to each other but be positioned as mirror images of each other. As best seen in FIG. 5, each connector may include a first leg 26a, a second leg 26b and a third leg 26c. First and third legs 26a, 26c are substantially parallel to each other and second leg 26b is oriented at right angles to first and second legs 26a, 26c. Connectors 18f, 18g are therefore generally Z-shaped (and reverse Z-shaped) when viewed from the side. Each first leg 26a may be engaged with the respective first end wall 18d or second end wall 18e and be oriented at right angles thereto. Each second leg 26b may be oriented generally parallel to first and second ends 18d, 18e and extend outwardly and downwardly from first legs 26a. Second legs 26b may extend for a distance below bottom wall 18a. Second legs 26b may terminate a distance inwardly from lower edge 18h' of flange 18h. Each third leg 26c may extend outwardly from a lower end of the associate second leg 26b and extend in a direction outwardly away from the associate first or second end 18c, 18d. Third legs 26c (and first legs 26a) may be aligned along a longitudinal axis of bottom housing 18. Third legs 26c may be aligned with each other when bus bar 14 is viewed from the side (as in FIG. 5) and may be positioned a distance "D" inwardly from lower edge 18h' of flange 18h. A hole 26d (FIG. 7) may be defined in each third leg 26c. Each hole 26d is a through hole that extends between an upper and lower surface of the third leg 26d within which hole 26d is defined. A gap 18r may be defined between each an inner surface of second leg 26b and an outer end of flange 18h.

Referring to FIGS. 7-9, 14A and 14B, spring bar 20 is shown in greater detail. Spring bar 20 may be a generally C-shaped component having a top wall 20a, a middle wall 20b and a bottom wall 20c. One or more regions of top wall 20a and middle wall 20b are partially stamped out, cut out or otherwise partially separated from a remaining portion of the spring bar 20 in such a way that a lower region of the stamped out, cut out or separated portion remains engaged with middle wall 20b and bottom wall 20c. The one or more regions form one or more spring contacts (or spring arms 28) that are selectively movable relative to the remaining portion of spring bar 20, as will be later described herein. The remaining portion of spring bar 20 is substantially stationary and does not move. The partial separation of these one or more regions creates openings 20d in the spring bar 20 and openings 20d are defined partially in top wall 20a and partially in middle wall 20b or wherever the stamped out, cut out or separated portion was previously located. The shape of the stamped out or cut out portions may resemble a reversed lower case "h" when viewed from the side as in FIG. 7. A first part of each opening 20d stamped or cut into top wall 20a may be a narrow elongate slot that is similarly shaped and sized to release ports 16e that are defined in top housing 16. The part of each opening 20d in middle wall 20b may be wider and partially aligns with one of the holes 24 defined by top housing 16 and bottom housing 18. As indicated above, the openings 20d may be formed by die-cutting or stamping out some of the metal of top wall 20a and middle wall 20b. The cut metal remains attached to bottom wall 20c and may be bent in such a way that it forms a contact spring or spring arm 28.

Figures 9, 10:
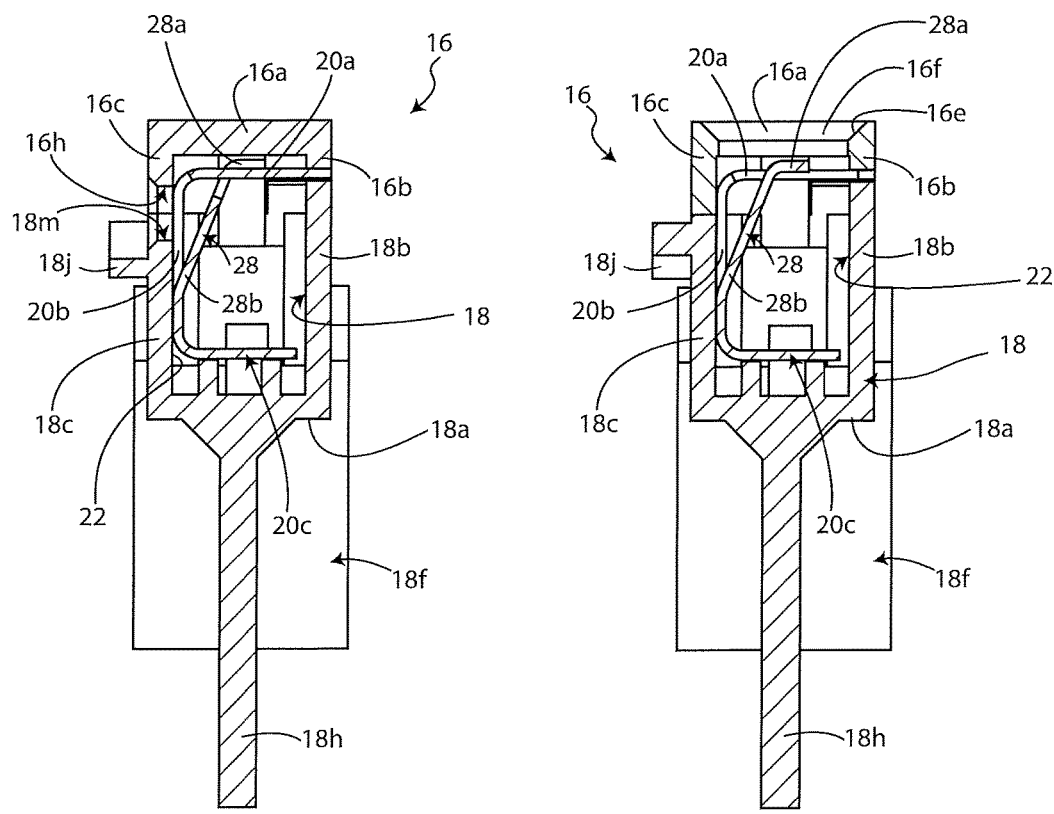
FIG. 9 is a cross-sectional view of the neutral bus bar taken along line 9-9 of FIG. 8.
FIG. 10 is a cross-sectional view of the neutral bus bar taken along line 10-10 of FIG. 8.

Spring arm 28 has a top leg 28a and a middle leg 28b. The middle leg 28b extends upwardly and outwardly from a region of middle wall 20b and/or bottom wall 12c of spring bar 20. FIG. 9 shows spring arm 28 in an at rest state. It can be seen that a region of middle wall 20b of spring bar 20 is oriented generally at right angles to bottom wall 20c (being separated by a curved corner region). Middle leg 28b of spring arm 28 angles away from an interior surface of the vertically oriented middle wall 12b at an angle of from about 5° up to about 15°. Top leg 28a extends rearwardly away from an upper end of middle leg 28b. Top leg 28a (when spring arm 28 is in the at rest position shown in FIG. 9) may be oriented generally parallel to bottom wall 20c of spring bar 20. Top leg 28a may be seated just above that portion of the opening 20d which is defined by top wall 20a of spring bar 20. Middle leg 28b may be seated in that portion of opening 20d that is defined in middle wall 20b. When space bar 20 is engaged between top housing 16 and bottom housing 18, top leg 28a of each spring arm 28 is located beneath one of the release ports 16e defined in top housing 16. This can be seen in FIGS. 9-11. At least part of middle leg 28b of each spring arm 28 may be aligned with one of the holes 24 formed by recesses 16h and 18m when top and bottom housings 16, 18 are engaged together. Each release port 16e and each associated hole 24 in bus bar 14 has a region of one of the plurality of spring contacts (i.e., spring arm 28) extending thereacross. In other words, part of each spring arm 28 at least partially extends across one release port 16e and hole 24 on bus bar 14.

FIG. 7 also shows that top wall 20a of spring bar 20 may define a U-shaped cut-out 20e and a notch 20f. Cut-out 20e may extend from a free edge of top wall 20a and terminate a short distance downwardly from a top end of middle wall 20b. Notch 20f similarly may extend from a free edge of top wall 20a and terminate a short distance downwardly from the top end of middle wall 20b. Notch 20f may also extend to a side edge of middle wall 20a. Cut-out 20e may be located so as to be vertically alignable with the first hole 16g in top housing 16 and laterally alignable with the first U-shaped recess 18n in bottom housing 18. A first hole 20g may be defined in middle wall 20a in a position that aligns laterally with first U-shaped recess 18n in bottom housing 18. A second hole and a third hole 20g may be defined in middle wall 20b. Second and third holes 20g may be located in a position that will laterally align with second and third U-shaped recesses 18n in bottom housing 18 when spring bar 20 and lower housing 18 are engaged. Notch 20g may be positioned vertically beneath second and third holes 16g in top housing and may be laterally aligned with second and third holes 20g and second and third U-shaped recesses 18n in bottom housing 18.

When neutral bus bar 14 is assembled, spring bar 20 may be seated in compartment 18k of bottom housing 18 such that bottom wall 20c of spring bar 20 may be located between detents 18a. First hole 20g may be aligned with first U-shaped recess 18n; second hole 20g may be aligned with second U-shaped recess 18n; and third hole 20g may be aligned with third U-shaped recess 18n. Top housing 16 may be placed over top wall 20a of spring bar 20 and pegs 16k may be inserted into the bores of detents 18q of bottom housing 18. Pegs 16k may be press-fit or otherwise secured into the bores of detents 18q. Spring bar 20 may thus be captured in the chamber 22 defined between top housing 16 and bottom housing 18.

Referring to FIGS. 1 and 2, when neutral bus bar 14 is engaged in electrical distribution box 10, each connector 18f, 18g is adapted to secure bus bar 14 to a surface of electrical distribution box 10. A pair of mounting brackets 30 are provided to engage connectors 18f, 18g. Each connector 18f, 18g may be engaged with a mounting bracket 30 provided on a plate 32 of box 10. A portion 30a of each mounting bracket 30 may be captured in gap 18r of the associated connector 18f, 18g. Connectors 18f, 18g may be received through a slot (not shown) of mounting bracket 30 and third legs 26c may rest on an upper surface of plate 32. Fasteners (not shown) may be inserted through apertures 26d defined in third legs 26c of connectors 18f, 18g, through aligned holes in plate 32. If plate 32 is not welded or otherwise secured to rear wall 10a, the fasteners may further extend through apertures in rear wall 10a of box 10. Once neutral bus bar 14 is engaged in box 10, electrical wiring may be connected thereto as follows.

Figure 11:
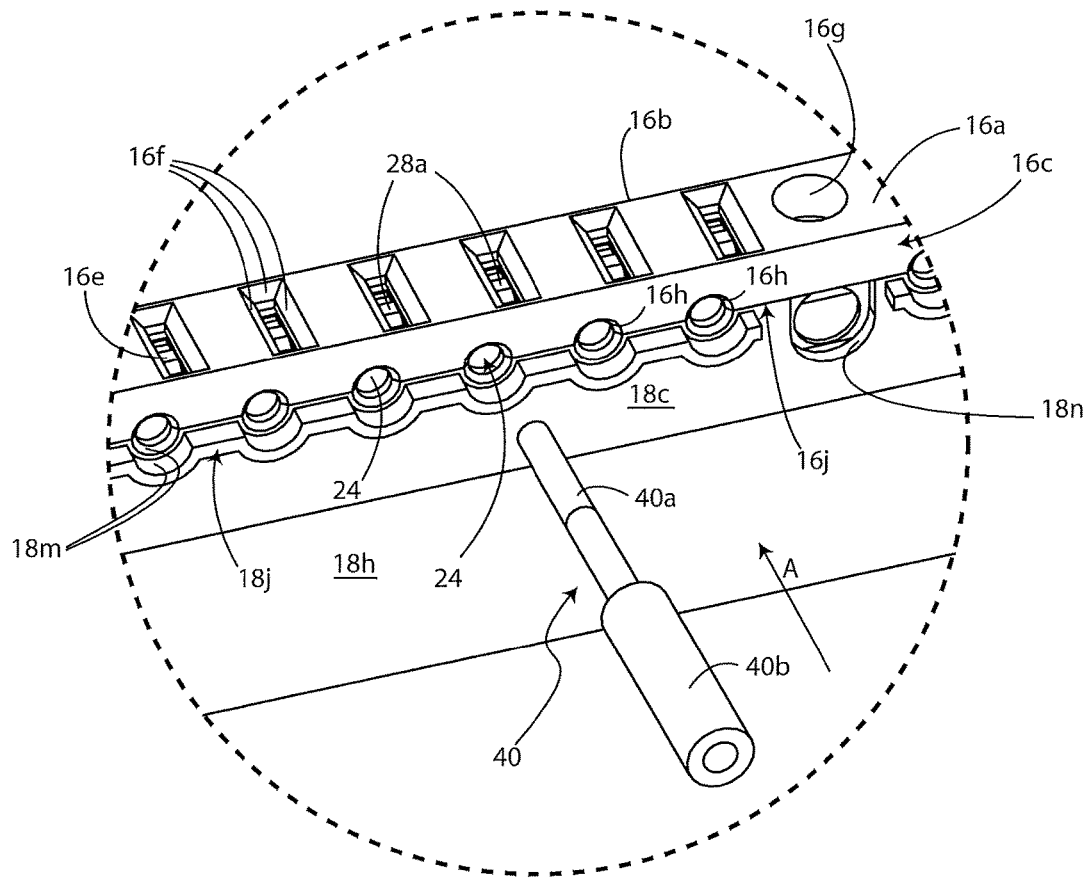
FIG. 11 is an enlarged partial perspective view of the neutral bus bar showing a portion of a wire about to be inserted into the neutral bus bar.
Figure 12A:
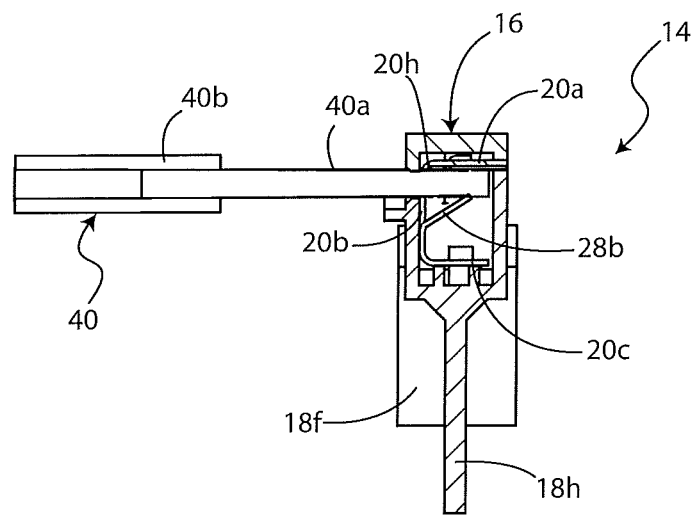
FIG. 12A is a cross-sectional view showing the portion of the neutral bus bar shown in FIG. 11A but with the wire inserted into the same.
Figure 11A:
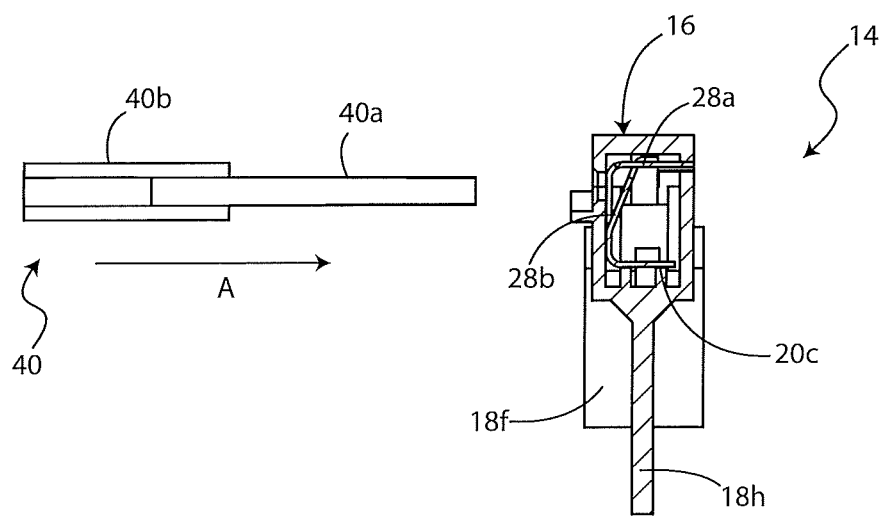
FIG. 11A is a cross-sectional view showing a portion of the neutral bus bar and the wire that is positioned to be inserted into the same.
Figure 12:
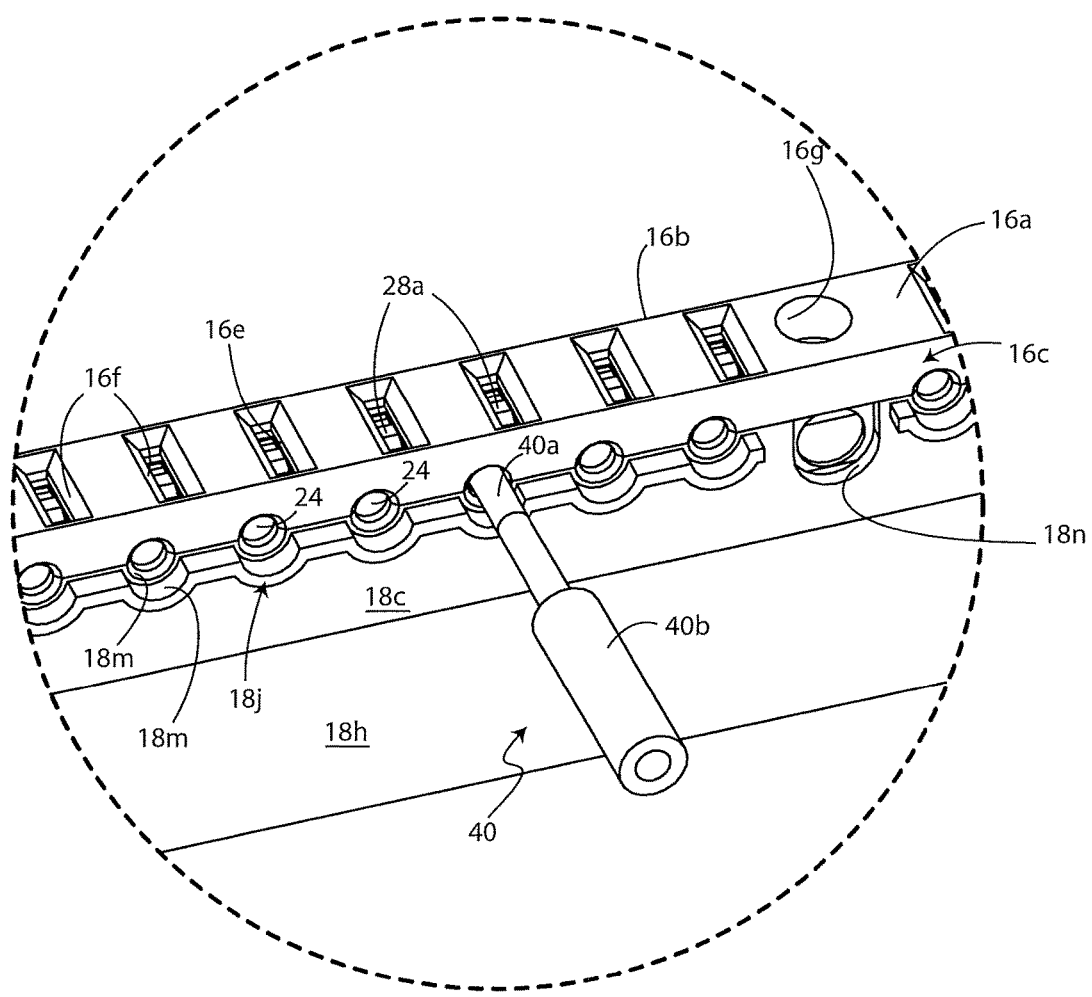
FIG. 12 is an enlarged partial perspective view of the neutral bus bar with the portion of the wire inserted into the same.

Referring to FIGS. 11 and 11A, a wire 40 is shown in a position ready to be engaged with neutral bus bar 14. (It will be understood that only an outermost end of wire 40 is shown in FIGS. 11 through 14B.) Wire 40 includes an end 40a that has been stripped of insulation 40b. End 40a is moved in the direction of arrow "A" (FIG. 11A) towards neutral bus bar 14. End 40a of wire 40 may be inserted through a selected one of the plurality of holes 24 defined in bus bar 14. FIG. 12A shows that as end 40a of wire 40 enters hole 24, end 40a contacts a region of middle leg 28b of spring arm 28 that is aligned with hole 24 and applies a force thereto, thus deflects spring arm 28 so that spring arm 28 moves from a first position (FIG. 11A) to a second position (FIG. 12A). In particular, end 40a of wire move spring arm 28 inwardly towards first side walls 16b, 18b and downwardly away from top wall 16a. Spring arm 28 is thus deflected from the at rest position shown in FIG. 11A to the position shown in FIG. 12A. End 40a of wire becomes trapped between the deflected region of middle leg 28b and a section of top wall 20a of spring bar 20. This section is identified in FIG. 14 by the reference character 20h. Top wall 20a, particularly section 20h, acts as a fixed contact for end 40a of wire 40 and spring arm 28 acts as a spring contact for end 40a of wire 40. Since spring arm 28 is biased toward section 20h of top wall 20a, end 40a of wire 40 is captured between the fixed contact 20h and spring contact of middle arm 28b of spring arm 28. Because both top wall 20a and middle arm 28b of spring arm 28 are fabricated from metal, these fixed and spring contacts are able to conduct electricity to and/or from wire 40. Because spring arm 28 is biased towards top wall 20a, any attempt to pull wire 40 back out of hole 24 in the opposite direction to arrow "A" simply increases the force with which wire 40 is retained between spring arm 28 and section 20h of top wall 20a. Wire 40 therefore will not become accidentally dislodged from neutral bus bar 14 and will remain electrically connected thereto.

Figure 13:
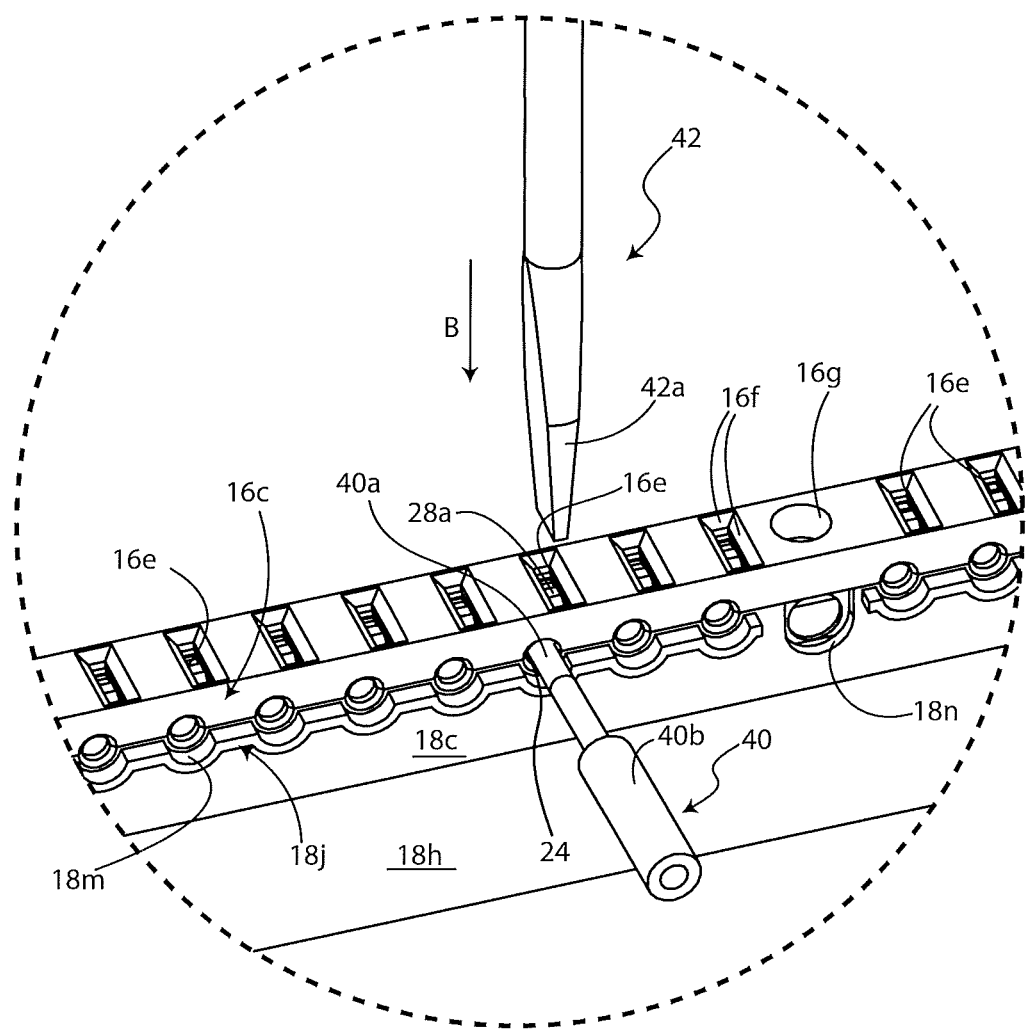
FIG. 13 is an enlarged partial perspective view of the neutral bus bar showing a wire engaged with the same and showing a tool positioned to disengage the wire from the neutral bus bar.
Figure 14:
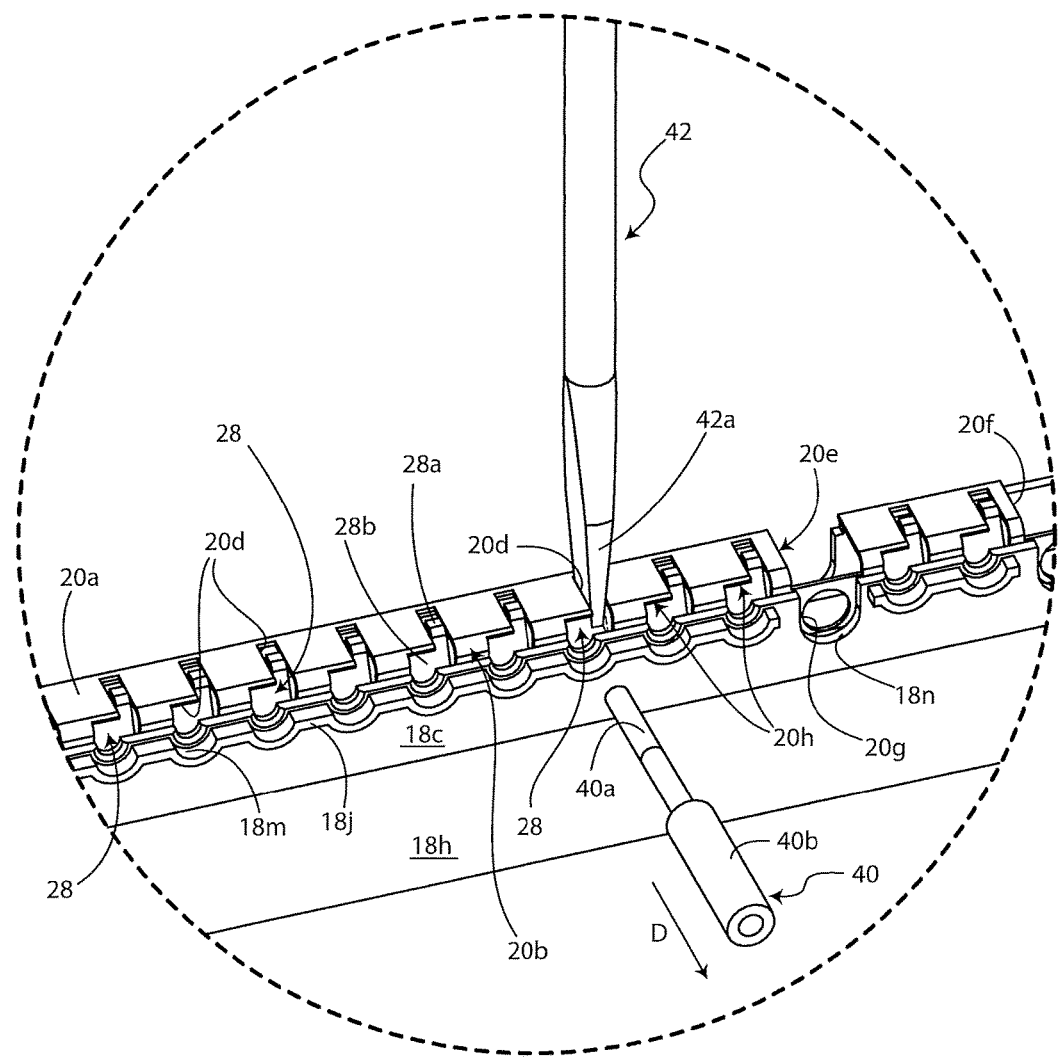
FIG. 14 is an enlarged partial perspective view of the neutral bus bar with the top housing removed and showing the tool engaged with the assembly and the wire released therefrom.
Figure 14A:
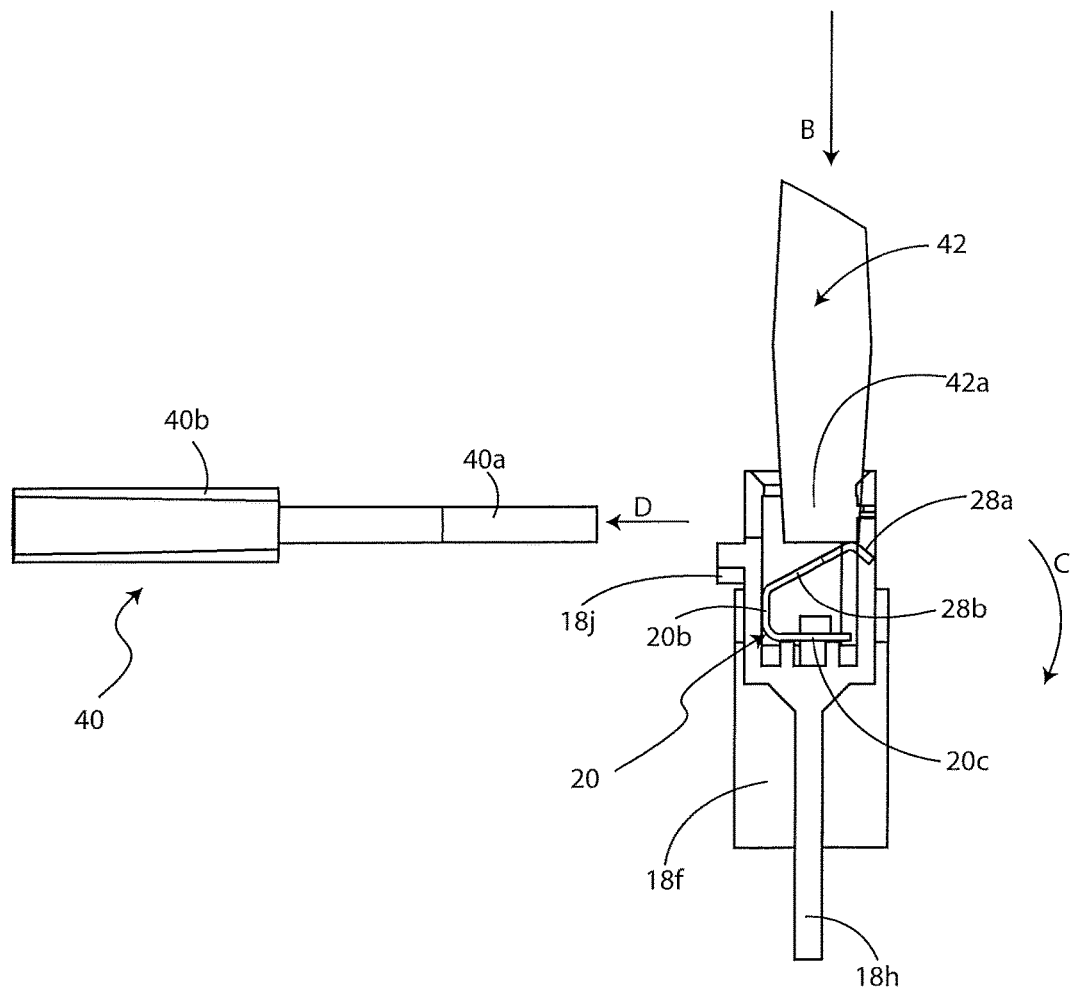
FIG. 14A is a cross-section of a portion of the neutral bus bar with the tool engaged with the assembly and the wire released therefrom.
Figure 14B:
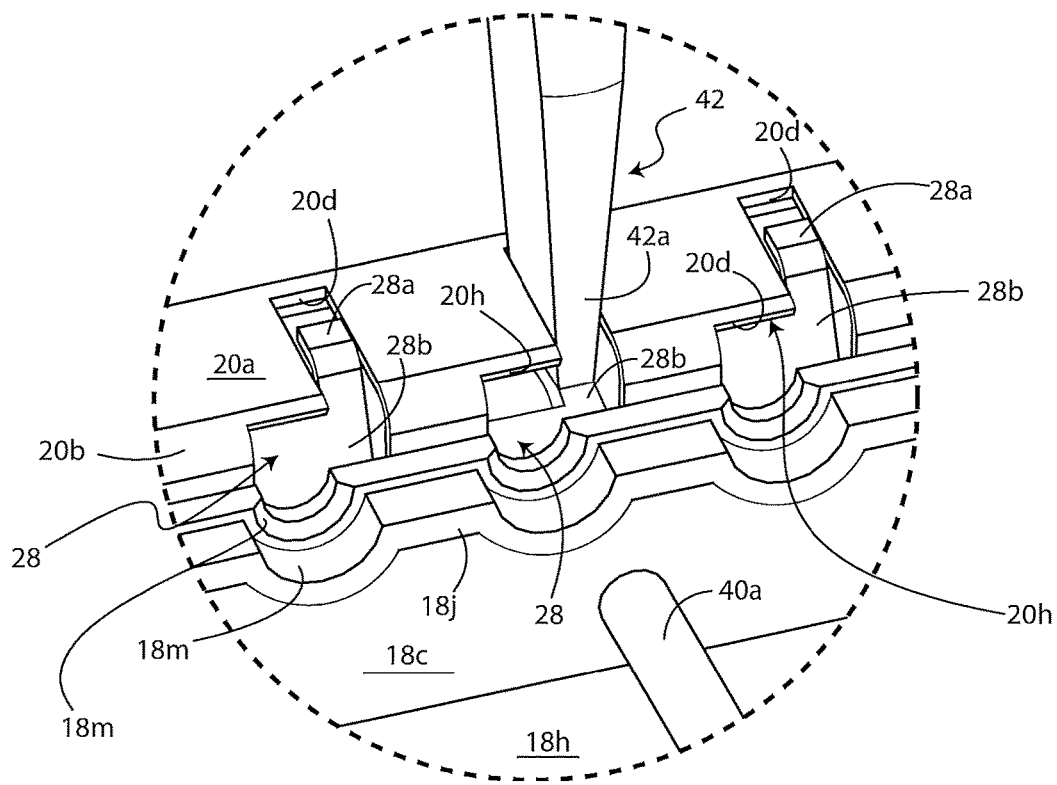
FIG. 14B is an enlargement of the highlighted region of FIG. 14.

FIG. 13 shows wire 40 captured in hole 24 of neutral bus bar 10. In order to release wire 40 from its engagement with neutral bus bar 10, a portion of a tool 42, such as an end 42a of a flat-head screwdriver, is inserted into the release port 16e associated with the particular hole 24 within which wire 40 is engaged. Tool 42 is moved downwardly in the direction of arrow "B" so that the end 42a thereof enters release port 16e to contact spring contact, i.e., spring arm 28. Beveled edge 16f that surrounds release port 16e aids in guiding end 42a of tool 42 into release port 16e. As end 42a enters release port 16e, end 42a contacts first leg 28a of spring arm 28 seated below release port 16e and extending upwardly through the opening 20d in top wall 20a of spring bar 20. Continued linear movement of tool 42 in the direction of arrow "B" causes a linear force to be applied to spring arm 28 and moves the spring arm from the second position (FIG. 12A) to a third position (FIG. 14A). In particular, application of the linear force to the spring contact, i.e., to spring arm 28, depresses first leg 28a and second leg 28b of spring arm 28 and causes them to be deflected inwardly and rearwardly in the direction of arrow "C" (FIG. 14A). Thus, the linear motion of tool 42 in the direction of arrow "B" causes a rotary movement "C" of spring arm 28. The spring contact (i.e., spring arm 28) is thus moved away from the fixed contact (i.e., top wall 20a) and a gap opens up between spring arm 28 and region 20h of top wall 20a of spring bar 20. This gap is sufficient to enable end 40a of wire 40 to slide out of hole 24 in the direction of arrow "D" (FIG. 14A) and therefore out of its engagement with neutral bus bar 10. When tool 42 is moved in the opposite direction of arrow "B" the spring arm 28 moves under spring force back to its at rest position (FIG. 11A) and is therefore ready for insertion of another wire into neutral bus bar 14 through the same selected hole 24.

It will be seen that connecting a wire to the neutral bus bar 14 in accordance with an aspect of the invention simply requires insertion of the stripped end of the wire into a selected hole 24 in housing 16/18 and the subsequent deflection of the spring arm as wire end 40a is inserted into hole 24. Removal of wire 40 from neutral bus bar 14 simply requires insertion of a tool into a release port 16e associated with the selected hole 24, application of a linear force in a downward direction through the release port 16e, deflecting spring arm away from an interior wall of the housing, creating a gap between the spring arm and the interior wall and withdrawing the wire 40 from hole 24.

It will be understood that instead of neutral bus bar 14 being comprised of a top housing 16 and a bottom housing 18 that are selectively engaged, bus bar may instead include a housing that is a substantially unitary component that has one side that is selectively removable to gain access into an interior chamber and into which spring bar 20 is inserted during fabrication. After insertion of spring bar 20, the removable side may be removably secured or permanently secured to the rest of housing, thereby sealing spring bar 20 within the chamber. In this instance, all of the various ports 16e, holes 16g, holes 24, recesses 18n, 18p will be formed in the exterior walls of the unitary housing.

It will be understood that a plastic coating may be applied around at least top leg 28a of spring arm 28. The top leg 28a of each spring arm 28 with a plastic coating thereon may form a non-conductive release actuator that may be contacted by a tool (such as tool 42 in FIG. 13) through release ports 16e and be less likely to potentially shock the user. The second leg 28b of spring arm 28 might not be coated with plastic and could therefore remain electrically conductive.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A bus bar for an electrical distribution box comprising: a housing having a wall that bounds and defines an interior chamber; said wall further defining a hole and a release port therein, where the hole and release port are in communication with the chamber; and wherein the hole and release port are oriented at an right angle relative to each other; an electrically conductive fixed contact located within the chamber; an electrically conductive spring contact located within the chamber; said spring contact having an arm that is selectively movable toward or away from the fixed contact; wherein the spring contact is partially aligned with the hole and is partially aligned with the release port; and wherein the spring contact is movable from a first position to a second position upon application of a force through the hole; and is moveable from the second position to a third position upon application for a force through the release port.

2. The bus bar as defined in claim 1, wherein the fixed contact and the spring contact are both components of a spring bar that is received within the chamber of the housing.

3. A bus bar for an electrical distribution box comprising:
a housing having a wall that bounds and defines an interior chamber; said wall further defining a hole and a release port therein, where the hole and release port are in communication with the chamber;
an electrically conductive fixed contact located within the chamber;
an electrically conductive spring contact located within the chamber; said spring contact having an arm that is selectively movable toward or away from the fixed contact; wherein the spring contact is partially aligned with the hole and is partially aligned with the release port; and wherein the spring contact is movable from a first position to a second position upon application of a force through the hole; and is moveable from the second position to a third position upon application for a force through the release port; wherein the fixed contact and the spring contact are both components of a spring bar that is received within the chamber of the housing; and wherein the spring bar is a generally C-shaped component having a top wall, a middle wall, and a bottom wall; and wherein one or more regions of the top wall and middle wall are partially separated from a remaining portion of the spring bar; and wherein each one of the one or more regions comprises one or more spring contacts that are selectively movable relative to the remaining portion of the spring bar.

4. The bus bar as defined in claim 3, wherein a portion of the spring bar adjacent each of the one of more spring contacts comprises an associated fixed contact that remains stationary when the spring contact moves.

5. The bus bar as defined in claim 2, wherein the spring bar is fabricated from an electrically conductive material.

6. The bus bar as defined in claim 1, wherein the housing is fabricated from a non-electrically conductive material.

7. A bus bar for an electrical distribution box comprising:
a housing having a wall that bounds and defines an interior chamber; said wall further defining a hole and a release port therein, where the hole and release port are in communication with the chamber;
an electrically conductive fixed contact located within the chamber;
an electrically conductive spring contact located within the chamber; said spring contact having an arm that is selectively movable toward or away from the fixed contact;
wherein the spring contact is partially aligned with the hole and is partially aligned with the release port; and wherein the spring contact is movable from a first position to a second position upon application of a force through the hole; and is moveable from the second position to a third position upon application for a force through the release port; wherein the fixed contact and the spring contact are both components of a spring bar that is received within the chamber of the housing; and wherein the housing comprises a top housing and a bottom housing that are selectively engageable with each other; wherein the top housing defines a first region of the chamber and the bottom housing defines a second region of the chamber; and wherein the spring bar is received partially within the first region of the chamber and partially with in the second region of the chamber.

8. The bus bar as defined in claim 7, wherein the release port is defined in the top housing.

9. The bus bar as defined in claim 7, further comprising a plurality of release ports defined in a top wall of the top housing; wherein the release ports are spaced at intervals along the top wall.

10. The bus bar as defined in claim 9, further comprising a plurality of holes defined in a side wall of one or both of the top housing and the bottom housing; wherein the holes are spaced at intervals along the side wall.

11. The bus bar as defined in claim 7, wherein each of the plurality of holes is defined partially by a recess defined by the top housing and partially by a recess defined by the bottom housing.

12. The bus bar as defined in claim 11, wherein each one of the plurality of holes is associated with one of the plurality of recess ports; and wherein the associated hole and release port each have a region of one of the plurality of spring contacts extending thereacross.

13. The bus bar as defined in claim 1, further comprising at least one connector provided on the housing, said at least one connector being adapted to secure the bus bar to a support surface.

14. A method using a neutral bus bar of an electrical distribution box, said method comprising: providing a neutral bus bar having a housing that includes a wall that bounds and defines an interior chamber; said wall further defining a hole and a release port therein, where the hole and release port are in communication with the chamber; and wherein the hole and release port are oriented at an right angle relative to each other; an electrically conductive fixed contact located within the chamber; an electrically conductive spring contact located within the chamber; said spring contact having an arm that is selectively movable toward or away from the fixed contact; wherein the spring contact is partially aligned with the hole and is partially aligned with the release port; and wherein the spring contact is movable from a first position to a second position upon application of a force through the hole; and is moveable from the second position to a third position upon application for a force through the release port; inserting a stripped end of a wire into the hole defined in the housing; deflecting the spring contact with the end of the wire; and capturing the end of the wire between the spring contact and the fixed contact.

15. The method as defined in claim 14, wherein the step of deflecting the spring contact includes applying a first linear force to the spring contact with the end of the wire.

16. The method as defined in claim 14, further comprising:
inserting a tool through the release port defined in a wall of the housing;
engaging the spring contact with the tool;
applying a force to the spring contact using the tool;
moving a portion of the spring contact through application of the linear force;
opening a gap between the spring contact and the fixed contact; and
withdrawing the end of the wire out of the hole in the housing.

17. The method as defined in claim 16, wherein the step of applying a force to the spring contact using the tool comprises applying a linear force to the spring contact.

18. The method as defined in claim 17, wherein the step of moving the portion of the spring contact further comprises rotating the portion of the spring contact in response to the applying of the linear force.

19. An electrical distribution box comprising: a box housing defining an interior compartment; at least one bus bar, wherein each of the at least one bus bar comprises a bus bar housing having a wall that bounds and defines an interior chamber; said wall further defining a hole and a release port therein, where the hole and release port are in communication with the chamber and are oriented at an right angle relative to each other; an electrically conductive fixed contact located within the chamber; an electrically conductive spring contact located within the chamber; said spring contact having an arm that is selectively movable toward or away from the fixed contact; wherein the spring contact is partially aligned with the hole and is partially aligned with the release port; and wherein the spring contact is movable from a first position to a second position upon application of a force through the hole; and is moveable from the second position to a third position upon application for a force through the release port.

20. An electrical distribution box comprising:
a box housing defining an interior compartment;
at least one bus bar, wherein each of the at least one bus bar comprises a bus bar housing having a wall that bounds and defines an interior chamber; said wall further defining a hole and a release port therein, where the hole and release port are in communication with the chamber;
an electrically conductive fixed contact located within the chamber;
an electrically conductive spring contact located within the chamber; said spring contact having an arm that is selectively movable toward or away from the fixed contact; wherein the spring contact is partially aligned with the hole and is partially aligned with the release port; and wherein the spring contact is movable from a first position to a second position upon application of a force through the hole; and is moveable from the second position to a third position upon application for a force through the release port; and
a pair of spaced-apart mounting brackets; and wherein each of the at least one bus bars further comprises a first connector and a second connector; and wherein each of the mounting brackets engages one of the first connector or the second connector and secures the at least one bus bar to the box housing.

21. The electrical distribution box as defined in claim 19, wherein the at least one bus bar is a neutral bus bar.

22. The bus bar as defined in claim 1, wherein a first region of the wall of the housing defines the hole and a second region of the wall of the housing defines the release port and wherein the first region and the second region of the wall are oriented at the angle relative to each other.

23. The bus bar as defined in claim 1, wherein the hole and release port are oriented at right angles relative to each other.

* * * * *